United States Patent
Lee et al.

(10) Patent No.: US 12,479,093 B2
(45) Date of Patent: Nov. 25, 2025

(54) DATA-EFFICIENT HIERARCHICAL REINFORCEMENT LEARNING

(71) Applicant: GOOGLE LLC, Mountain View, CA (US)

(72) Inventors: Honglak Lee, Mountain View, CA (US); Shixiang Gu, Mountain View, CA (US); Sergey Levine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/673,510

(22) Filed: May 24, 2024

(65) Prior Publication Data

US 2024/0308068 A1    Sep. 19, 2024

Related U.S. Application Data

(63) Continuation of application No. 17/050,546, filed as application No. PCT/US2019/032880 on May 17, 2019, now Pat. No. 11,992,944.
(Continued)

(51) Int. Cl.
*B25J 9/16* (2006.01)

(52) U.S. Cl.
CPC .................... *B25J 9/163* (2013.01)

(58) Field of Classification Search
CPC ................ B25J 9/163; B25J 9/1664; G05B 2219/39271
See application file for complete search history.

(56) References Cited

U.S. PATENT DOCUMENTS 9,792,397 B1   10/2017 Nagaraja
11,403,513 B2   8/2022 Hasenclever
(Continued)

FOREIGN PATENT DOCUMENTS

CN         107357939       11/2017
WO         2019222634      11/2019

OTHER PUBLICATIONS

China National Intellectual Property Administration; Notice of Allowance issued in Application No. 201980033340.5; 7 pages; dated Jul. 31, 2023.
(Continued)

*Primary Examiner* — Luke Huynh
(74) *Attorney, Agent, or Firm* — Gray Ice Higdon

(57) ABSTRACT

Training and/or utilizing a hierarchical reinforcement learning (HRL) model for robotic control. The HRL model can include at least a higher-level policy model and a lower-level policy model. Some implementations relate to technique(s) that enable more efficient off-policy training to be utilized in training of the higher-level policy model and/or the lower-level policy model. Some of those implementations utilize off-policy correction, which re-labels higher-level actions of experience data, generated in the past utilizing a previously trained version of the HRL model, with modified higher-level actions. The modified higher-level actions are then utilized to off-policy train the higher-level policy model. This can enable effective off-policy training despite the lower-level policy model being a different version at training time (relative to the version when the experience data was collected).

16 Claims, 6 Drawing Sheets

Related U.S. Application Data

(60) Provisional application No. 62/673,746, filed on May 18, 2018.

(56) References Cited

U.S. PATENT DOCUMENTS

| | | | | |
|---|---|---|---|---|
| 11,574,550 | B2 * | 2/2023 | Kanayama | G09B 5/06 |
| 11,673,266 | B2 * | 6/2023 | Shibata | B25J 9/1664 |
| | | | | 700/245 |
| 11,992,944 | B2 * | 5/2024 | Lee | B25J 9/163 |
| 2007/0094187 | A1 | 4/2007 | Anderson | |
| 2017/0061283 | A1 | 3/2017 | Rasmussen | |
| 2018/0165603 | A1 | 6/2018 | Van Seijen | |
| 2021/0046648 | A1 * | 2/2021 | Schmitt | B25J 9/1671 |
| 2021/0187733 | A1 | 6/2021 | Lee et al. | |

OTHER PUBLICATIONS

China National Intellectual Property Administration; First Office Action issued in Application No. 201980033340.5; 12 pages; dated Feb. 7, 2023.
European Patent Office; Communication pursuant to Article 94(3) EPC issued in U.S. Appl. No. 19/732,780; 10 pages; dated Mar. 29, 2023.
Levy, A. et al., "Hierarchical Actor-Critic"; retrieved from internet: URL:https://arxiv.org/pdf/1712.00948v3.pdf [retrieved Sep. 10, 2019]; 10 pages; Feb. 28, 2018.
Kingma, Diederik P et al.; Auto-encoding variational bayes. arXiv preprint arXiv:1312.6114; pp. 1-14; dated 2013.
Andrychowicz, M. et al., "Hindsight Experience Replay"; arxiv.org, Cornell University Library; 15 pages; Jul. 5, 2017.
Lillicrap, Timothy et al.; Continuous control with deep reinforcement learning. arXiv preprint arXiv:1509.02971; pp. 1-14; dated 2015.
Schaul, Tom et al.; Universal value function approximators; In International Conference on Machine Learning; 9 pages; dated 2015.
Schlman, John et al.; Trust region policy optimization. In International Conference on Machine Leaming; 9 pages; dated 2015.
Duan, Yan et a.; Benchmarking deep reinforcement learning for continuous control. In International Conference on Machine Learning, 10 pages; dated 2016.
Gu, Shixiang et al.; Q-prop: Sample efficient policy gradient with an off policy critic; pp. 1-13; dated 2016.
Heess, Nicolas et al.; Learning and transfer of modulated locomotor controllers. arXiv preprint arXiv:1610.05182; pp. 1-13; dated 2016.
Houthooft, Rein et al.; Vime: Variational information maximizing exploration; In Advances in Neural Information Processing Systems; pp. 1-9; dated 2016.
Munos, Remi et al.; Safe and efficient off-policy reinforcement learning. In Advances in Neural Information Processing Systems; pp. 1-9; dated 2016.
Vezhnevets, Alexander et al.; Strategic attentive writer for learning macro-actions; In Advances in neural information processing systems; 12 pages; dated 2016.
Kulkarni, T. et al., "Hierarchical Deep Reinforcement Learning: Integrating Temporal Abstraction and Intrinsic Motivation"; retrieved from internet: URL:https:/arxiv.org/pdf/1604.06057.pdf [retrieved on Sep. 10, 2019]; 14 pages; May 31, 2016.
Bacon, Pierre et al.; The Option-critic Architecture; In AAAI; 9 pages; dated 2017.
Florensa, et al.; Stochastic neural networks for hierarchical reinforcement learning; p. 1-17; dated 2017.
Gu, Shixiang et al.; Deep reinforcement learning for robotic manipulation with asynchronous off policy updates. In Robotics and Automation; International Conference; pp. 1-9; dated 2017.
Gu, Shixiang et al.; Interpolated policy gradient: Merging on-policy and off-policy gradient estimation for deep reinforcement learning. In Advances in Neural Information Processing Systems; pp. 1-10; dated 2017.
Harb, Jean et al.; When waiting is not an option: Learning options with a deliberation cost. arXiv preprint arXiv:1709.04571; 9 pages; dated 2017.
Heess, Nicolas et al.; Emergence of locomotion behaviours in rich environments. arXiv preprint arXiv:1707.02286; pp. 1-14; dated 2017.
Held, David et al.; Automatic goal generation for reinforcement learning agents; arXiv preprint arXiv:1705.06366; pp. 1-17; dated 2017.
Nachum, Ofir; Trust-pcl: An off-policy trust region method for continuous control. arXiv preprint arXiv:1707.01891; pp. 1-14; dated 2017.
Rajeswaran, Aravind et al.; Learning complex dexterous manipulation with deep reinforcement learning and demonstrations; arXiv preprint arXiv:1709.10087; 9 pages; dated 2017.
Rajeswaran, Aravind et al.; Towards generaliztion and simplicity in continuous control. In Advances in Neural Information Processing Systems; p. 1-12; dated 2017.
Vecerik, Matej et al.; Leveraging demonstrations for deep reinforcement learning on robotics problems with sparse rewards; arXiv preprint arXiv:1707.08817; p. 1-10; dated 2017.
Vezhnevets, Alexander et al.; Feudal networks for hierarchical reinforcement learning arXiv preprint arXiv:1703.01161; p. 1-9; dated 2017.
Wang, Ziyu et al.; Sample efficient actor-critic with experience replay. International Sample efficient actor-critic with experience replay. International; p. 1-20; dated 2017.
Frans, Kevin et al.; Meta learning shared hierarchies; International Conference on Learning Representations; pp. 1-11; dated 2018.
Haamoja, Tuomas et al.; Soft actor-critic: Off-policy maximum entropy deep reinforcement learning with a stochastic actor; arXiv preprint arXiv:1801.01290; dated 2018.
Levine, Sergey et al.; Temporal difference model learning: Model-free deep rl for model-based control; ICLR; pp. 1-14; dated 2018.
Pong, Vitchyr et al.; Temporal difference models: Model-free deep rl for model-based control. International Conference on Learning Representations; pp. 1-14; dated 2018.
Sigaud, Oliver et al.; Policy search in continuous action domains: an overview. arXiv preprint arXiv:1803.04706; p. 1-18; dated 2018.
Plappert, Matthias et al.; Multi-goal reinforcement learning: Challenging robotics environments and request for research. arXiv preprint arXiv:1802.09464; pp. 1-16; dated Mar. 10, 2018.
Fujimoto, Scott et al.; "Addressing Function Approximation Error in Actor-Critic Methods;" Cornell University, arXiv.org, arXiv:1802.09477; 15 pages; dated Oct. 22, 2018.
European Patent Office; International Search Report and Written Opinion of PCT Ser. No. PCT/US2019/032880; 20 pages; dated Sep. 20, 2019.
Dayan, Peter et al.; Feudal reinforcement learning. In Advances in neural information processing systems; pp. 271-278; dated 1993.
Parr, Ronald et al.; Reinforcement Learning with Hierarchies of Machines; In Advances in neural information processing systems; pp. 1043-1049; dated 1998.
Sutton, Richard S. et al.; Between mdps and semi-mdps: A framework for temporal abstraction in reinforcement learning; Artificial intelligence; pp. 181-211; dated 1999.
Dietterich, Thomas G.; Hierarchical reinforcement learning with the maxq value function decomposition. Journal of Artificial Intelligence Research; pp. 227-303; dated 2000.
Precup, Doina; Temporal abstraction in reinforcement learning. University of Massachusetts Amherst; 146 pages; dated 2000.
Stolle, Martin et al.; Learning options in reinforcement learning. In International Symposium on abstraction, reformulation, and approximation; 8 pages; dated 2002.
Barto, Andrew G. et al.; Recent advances in hierarchical reinforcement learning; Discrete Event Dynamic Systems; p. 41-77; dated 2003.
Mannor, Shie et al.; Dynamic abstraction in reinforcement learning via clustering. In Proceedings of the twenty-first international conference on Machine earning; ACM; 8 pages; dated 2004.
Chentanez, Nuttapong et al.; Intrinsically motivated reinforcement learning; In Advances in neural information processing systems; 8 pages; dated 2005.

(56) References Cited

OTHER PUBLICATIONS

Konidaris, George et al.; Building portable options: Skill transfer in reinforcement learning. In IJCAI, vol. 7, pp. 895-900; dated 2007.

Mahadevan, Sridhar et al.; Proto-value functions: A laplacian framework for learning representation and control in markov decision processes. Journal of Machine Learning Research; pp. 2169-2231; dated 2007.

Sutton, Richard S. et al.; Horde: A scalable real-time architecture for learning knowledge from unsupervised sensorimotor interaction. In The 10th International Conference on Autonomous Agents and Multiagent Systems; 9 pages; dated 2011.

Bloch, Mitchell Keith, "Reducing Commitment to Tasks with Off-Policy Hierarchical Reinforcement Learning"; arxiv.org; Cornell University Library; 7 pages; Apr. 27, 2011.

\* cited by examiner

DATA-EFFICIENT HIERARCHICAL REINFORCEMENT LEARNING

BACKGROUND

Many robots are manually programmed to perform certain tasks. For example, a robot on an assembly line can be manually programmed to recognize certain objects, and perform particular manipulations to those certain objects.

Further, some robots can utilize one or more trained machine learning models in performing certain tasks. For instance, deep reinforcement learning (RL) has been proposed and utilized for some continuous robot control tasks, such as locomotion and object manipulation. However, such robot control tasks are atomic, in that they require performance of some skill either episodically or cyclically. Such robot control tasks do not involve complex multi-level reasoning such as utilizing a variety of locomotion behaviors to accomplish complex goals that require movement, interaction with objects, and discrete decision-making.

SUMMARY

Implementations disclosed herein relate to training and/or utilizing a multi-level hierarchical reinforcement learning (HRL) model for robotic control. The HRL model can include at least a higher-level policy model and a lower-level policy model. The higher-level policy model and the lower-level policy model can each be a corresponding machine-learning model, such as a neural network model. The higher-level policy model is utilized to process, at corresponding control steps (e.g., every c control steps, where c is >1), a current state to generate a higher-level action (also referred to herein as a higher-level goal). The current state can include, for example, robotic state observations of a robotic agent being controlled (e.g., a position and orientation of a robotic agent and its limbs), and optionally environment state observations of an environment in which the robotic agent is deployed. The higher-level action can be, for example, a robotic state differential that is the difference between a current robotic state and the goal robotic state (e.g., a desired relative change to a current robotic state observation). In other words, the higher-level action at a given time step can itself be a robotic state that, if applied to a current robotic state, will result in a resulting robotic state that is close to a goal robotic state.

The lower-level policy model is utilized to process, at each time step, a current state observation and a current higher-level action, to generate a corresponding lower-level action to be utilized to directly control the robot. In various implementations, the higher-level policy model is utilized to generate a corresponding higher-level action only every c control steps (where c>1), whereas the lower-level policy model is utilized to generate a corresponding lower-level action at each control step. This enables temporally extended planning using the higher-level policy model, while the lower-level policy model is utilized at each control step to generate lower-level commands to control the robot in view of goal states from the temporally extended planning. Accordingly, the current higher-level action processed at a given control step can be one generated directly using the higher-level policy model (if it generated one in the given control step) or can be determined using a fixed goal transition function that is used to transition the higher-level action to a new higher-level action at each of the intermediate control steps. The lower-level action generated using the lower-level policy can take various forms such as, for example, torques to be applied to actuators of the robot. The lower-level actions are utilized to directly control the robot by, for example, generating and/or providing corresponding control commands to actuator(s) of the robot.

Experience data is used in training the HRL model. The lower-level policy model of the HRL model can be trained by using corresponding higher-level actions in determining goal states, and rewarding the lower-level policy model for performing actions which yield a robot observation state that is close to matching the desired goal. For example, where the higher-level action at a given step is a robotic state differential indicating a goal state, the lower-level policy can be rewarded when it performs an action that causes the robot to transition to a state that matches or is close to the goal state (optionally rewarded based on how closely it matches). Accordingly, in generating a reward, the state observation generated based on applying the lower-level action can be compared to the goal state indicated by the higher-level action. Thus, goal states and state observations can be utilized directly in determining the reward, which can be more efficient than alternative techniques that require training the goal representation. This allows the lower-level policy model to be effectively trained using a reward signal immediately, even before the lower-level policy model has been trained to enable effectively reaching the goal state, and before the higher-level reward (based on the task for which the HRL model is being trained) provides any meaningful supervision. This can lead to the lower-level policy model being trained in fewer iterations and with less experience data, conserving resources utilized in training and in generating experience data. Moreover, this enables off-policy training of the lower-level policy model, as the rewards used in training the lower-level policy model are determined independent of the task-based environment reward on which the higher-level policy model is being trained. Off-policy training enables training in fewer iterations and with less experience data, likewise conserving resources.

The higher-level policy model of the HRL model can be trained, jointly with the lower-level policy model and also utilizing off-policy training. However, off-policy training can pose various challenges in HRL. For example, since the lower-level policy model is changing underneath the higher-level policy model, an experience observed with respect to a certain higher-level action in the past may not yield the same lower-level behavior in the future, and thus not be a valid experience for training of the higher-level policy model (since the lower-level behaviors affect the environment reward). Implementations disclosed herein remedy this through utilization of an off-policy correction, which re-labels higher-level actions of experience data, generated in the past utilizing a previously trained version of the higher-level policy model, with modified higher-level actions. The modified higher-level actions can be selected to seek higher-level actions that would result in the same/similar environment rewards of the experience data. In some implementations, the modified higher-level actions can be chosen to maximize the probability of the past lower-level actions of the experience data (thereby increasing the probability of the corresponding environment rewards of the experience data). Various particular techniques for generating modified higher-level actions are disclosed in more detail herein.

In some implementations, a method of off-policy training of a higher-level policy model of a hierarchical reinforcement learning model for use in robotic control is provided. In some of those implementations, the method includes retrieving given past experience data from previously stored experience data, for a robot, generated based on controlling the robot during a previous experience episode using the hierarchical reinforcement learning model in a previously trained state. The retrieved given past experience data can include: a stored state based on an observed state of the robot in the previous experience episode; a stored higher-level action for transitioning from the stored state to a goal state; and at least one stored environment reward determined based on application of the lower-level action during the previous episode. The stored higher-level action is one previously generated, during the previous experience episode, using the higher-level policy model. Further, the stored higher-level action is one previously processed, during the previous episode using a lower-level policy model of the hierarchical reinforcement learning model, in generating a lower-level action applied to the robot during the previous experience episode. The method further includes determining a modified higher-level action to utilize in lieu of the stored higher-level action for further training of the hierarchical reinforcement learning model. Determining the modified higher-level action is based on a currently trained state of the lower-level policy model. The currently trained state of the lower-level policy model differs from the previously trained state (utilized during the previous experience episode). The method further includes further off-policy training the higher-level policy model using the stored state, using the at least one stored environment reward, and using the modified higher-level action in lieu of the stored higher-level action.

These and other implementations of the technology may include one or more of the following features.

In some implementations, the method further includes, subsequent to the further off-policy training, using the hierarchical reinforcement learning model to control one or more actuators of an additional robot.

In some implementations, determining the modified higher-level action based on the stored higher-level action and based on the currently trained state of the lower-level policy model, includes: identifying a plurality of candidate modified higher-level actions, including the modified higher-level action; and selecting the modified higher-level action based on determining that the modified higher-level action has a greater probability, than other of the candidate modified higher-level actions, of inducing the lower-level action if applied with the stored state observation to the lower-level policy model in the currently trained state of the lower-level policy model. In some versions of those implementations, the method further includes: selecting the modified higher-level action over the stored higher-level action based on determining that the modified higher-level action has a greater probability, than the stored higher-level action, of inducing the lower-level action if applied with the stored state to the lower-level policy model in the currently trained state of the lower-level policy model. In some additional or alternative versions of those implementations, identifying the plurality of candidate modified higher-level actions includes selecting a fixed number of candidate modified higher-level actions. For example, selecting the fixed number of candidate modified higher-level actions can be based on a random sampling from a Gaussian that is centered based on the stored state observation.

In some implementations, the stored state includes positions for a plurality of components of the robot. In some of those implementations, the stored state lacks any velocity, acceleration, and/or jerk for any components of the robot.

In some implementations, the method further includes off-policy training the lower-level policy model based on a parameterized reward. In some versions of those implementations, the parameterized reward is determined based on: the higher-level action, and a given state of the robot, during the previous experience episode, that resulted from application of the lower-level action. In some of those versions, the method further includes determining the parameterized reward based on distance between the goal state and the given state.

In some implementations, the previous experience episode is performed in simulation and the robot is a simulated robot.

In some implementations, the environment reward is determined based on a state observation following application of the lower-level action during the previous episode. In some of those implementations, the environment reward is determined based on a task for which the higher-level policy model is being trained.

In some implementations, a method implemented by one or more processors is provided and includes identifying a current state observation of a robot. The method further includes determining, using a higher-level policy model of a hierarchical reinforcement learning model, a higher-level action for transitioning from the current state observation to a goal state observation. The method further includes generating an atomic action based on processing the current state observation and the higher-level action using a lower-level policy model of the hierarchical reinforcement learning model. The method further includes applying the atomic action to the robot to cause the robot to transition to an updated state. The method further includes generating an intrinsic reward for the atomic action. The intrinsic reward is generated based on the updated state and the goal state observation. The method further includes training the lower-level policy model based on the intrinsic reward for the atomic action.

These and other implementations of the technology may include one or more of the following features.

In some implementations, the method further includes, subsequent to the training, using the hierarchical reinforcement learning model to control one or more actuators of an additional robot.

In some implementations, the robot is a simulated robot.

In some implementations, generating the intrinsic reward based on the updated state and the goal state observation includes generating the intrinsic reward based on an L2 difference between the updated state and the goal state observation.

In some implementations, the method further includes generating an environment reward, and training the higher-level policy model based on the environment reward.

In some implementations, a method implemented by one or more processors of a robot is provided and includes identifying a current state of the robot. The method further includes determining, at a first control step and using a higher-level policy model of a hierarchical reinforcement learning model, a higher-level action for transitioning from the current state to a goal state. The method further includes generating a first lower-level action for the first control step based on processing the current state and the higher-level action using a lower-level policy model of the hierarchical reinforcement learning model. The method further includes applying the first lower-level action to the robot to cause the robot to transition to an updated state. The method further includes generating, at a second control step that follows the first control step, an updated higher-level action by applying at least the current state, the updated state, and the higher-level action to a transition function. The method further includes generating a second lower-level action for the second control step based on processing the updated state and the updated higher-level action using the lower-level policy model. The method further includes applying the second lower-level action to the robot to cause the robot to transition to a further updated state.

Other implementations may include a non-transitory computer readable storage medium storing instructions executable by one or more processors (e.g., one or more central processing units (CPUs). one or more graphics processing units (GPUs), and/or one or more tensor processing units (TPUs)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
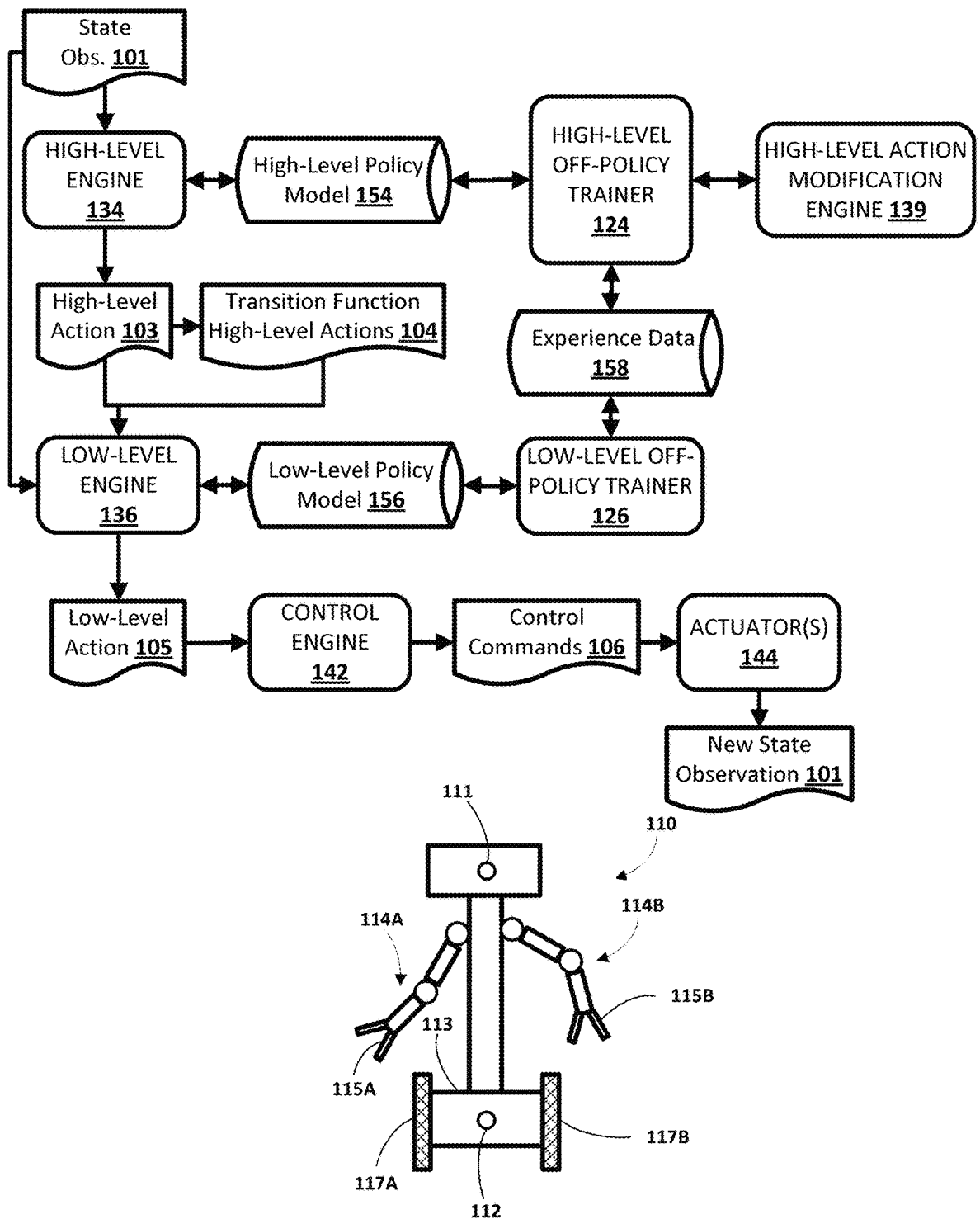
FIG. 1 illustrates an example environment in which implementations disclosed herein can be implemented.

Prior to reference to the Figures, an overview of particular implementations of technology disclosed herein is provided. It is understood that the disclosure herein is not limited to such implementations, and additional implementations are disclosed herein (e.g., in the Summary, the remainder of the Detailed Description, and the Claims).

Deep reinforcement learning (RL) has been proposed for a range of continuous robotic control tasks, such as locomotion skills, learning dexterous manipulation behaviors, etc. However, most of those continuous robotic control tasks are inherently atomic in that they require performing some simple skill, either episodically or cyclically. They rarely involve complex multi-level reasoning, such as utilizing a variety of locomotion behaviors to accomplish complex goals that require movement, interaction with objects, and discrete decision-making.

Hierarchical reinforcement learning (HRL), in which multiple layers of policy models are trained to perform decision-making and control at successively higher levels of temporal and behavioral abstraction, has long held the promise to be able to learn such complex multi-level reasoning tasks. By having a hierarchy of policy models, of which only the lowest-level policy model is used to generate actions applied to the environment, the higher-level policy model(s) can be trained to plan over a longer time scale. Moreover, if the higher-level actions generated using the higher-level policy models correspond to semantically different lower-level behavior, exploration techniques can be applied to more appropriately explore a complex environment. However, there is a large gap between the basic definition of HRL and the promise it holds to successfully solve complex environments.

Implementations disclosed herein take advantage of the state observations provided by the environment during exploration episodes. For example, in locomotion tasks, a state observation can include the position and orientation of the robotic agent and its limbs. Those implementations interpret the ability of an agent to match the environment observation to a desired goal state as a suite of tasks which induce a diverse set of behaviors. That is, the higher-level actions generated by the higher-level policy model are utilized in generating goal states, and the lower-level policy model is rewarded for performing actions which yield an observation close to matching the desired goal states. In this way, the HRL setup according to implementations disclosed herein does not require a multi-task design and is fully general.

Implementations further present techniques for effectively utilizing off-policy training in HRL model training. Off-policy training is more data efficient than on-policy training. For example, it requires less computer resources (e.g., processor and/or memory resources) in training and/or in generating experience data for training. However, off-policy training presents problems in HRL since the lower-level policy model is changing underneath the higher-level policy model. As a result, an experience observed with respect to a certain higher-level action in the past may not yield the same lower-level behavior in the future, and thus not be a valid experience for training. Techniques disclosed herein remedy this issue by introducing an off-policy correction, which re-labels a higher-level action, of an experience in the past (included in experience data), with a modified higher-level action, such as one chosen to maximize the probability of the past lower-level actions. In these and other manners, past experiences can be utilized for effectively training the higher-level policy model using more efficient off-policy RL methods.

Accordingly, various implementations disclosed herein train a multi-level HRL model in a manner that is generally applicable and/or data-efficient. Generality is achieved by training the lower-level policy model, of the HRL model, to reach goal states learned and instructed using the higher-level policy model(s). Data efficiency is achieved by using off-policy training, with off-policy correction, for training higher level policy model(s) of the HRL model. The techniques disclosed herein enable training of HRL models that can successfully perform complex sequences of interactions with objects in the environment.

Implementations disclosed herein adopt the standard continuous-control RL setting, in which an agent (e.g., a real or simulated robot) interacts with an environment over long periods of time according to a behavior policy $\mu$. With the standard continuous-control RL setting, at each time step t, the environment produces a state observation $s_t \in \mathbb{R}^{d_s}$. The agent then samples an action at $\sim \mu(s_t)$, $a_t \in \mathbb{R}^{d_a}$ and applies the action to the environment. The environment then yields a reward $R_t$ sampled from an unknown reward function $R(s_t, a_t)$ and either terminates the episode at state $s_T$ or transitions to a new state $s_{t+1}$ sampled from an unknown transition function $f(s_t, a_t)$. The agent's goal is to maximize the expected future discounted reward $\mathbb{E}_{s_{0:T}, a_{0:T-1}, R_{0:T-1}} [\Sigma_{i=0}^{T-1} \gamma^i R_i]$, where $0 \leq \gamma < 1$ is a user-specified discount factor. A well-performing RL algorithm will learn a good behavior policy $\mu$ from (ideally a small number of) interactions with the environment.

Implementations disclosed herein utilize temporal difference learning, which is a powerful paradigm in RL in which a policy can be learned efficiently from state-action-reward transition tuples $(s_t, a_t, R_t, s_{t+1})$ that are collected from interactions with the environment. Interactions can include simulated interactions of a simulated robot with a simulated environment and/or real interactions of a real robot with a real environment. Some implementations disclosed herein utilize the Twin Delayed (TD3) Deep Deterministic Policy Gradient (DDPG) learning algorithm, which is a variant of the DDPG algorithm for continuous control.

In DDPG, a deterministic neural network policy $\mu_\phi$ is learned along with its corresponding state-action Q-function $Q_\theta$. The Q-function represents the future value of taking a specific action $a_t$ starting from a state $s_t$. Accordingly, it is trained to minimize the average Bellman error over all sampled transitions which is given by:

$$\varepsilon(s_t, a_t, s_{t+1}) = (Q_\theta(s_t, a_t) - R_t - \gamma Q_\theta(s_{t+1}, \mu_\phi(s_{t+1})))^2 \quad (1)$$

The policy is then trained to yield actions which maximize the Q-value at each state. That is, $\mu_\phi$ is trained to maximize $Q_\theta(s_t, \mu_\phi(s_t))$, over all $s_t$ collected from interactions with the environment.

Although DDPG trains a deterministic policy $\mu_\phi$, it is noted that its behavior policy, which is used to collect experience during training, is augmented with Gaussian (or Ornstein-Uhlenbeck) noise. Therefore, actions are collected as $a_t \sim N(\mu_\phi(s_t), \sigma)$ for fixed $\sigma$, which will be shortened herein as $a_t \sim \mu_\phi(s_t)$. Implementations disclosed herein can take advantage of this fact that the behavior policy is stochastic. In particular, implementations of off-policy correction, that generate modified higher-level actions in off-policy training of the higher-level policy model, can take advantage of this fact. TD3 makes several modifications to DDPG's learning algorithm to yield a more robust and stable RL learning algorithm. Its main modification is using an ensemble over Q-value models and adding noise to the policy when computing the target value in Equation 1 (above).

Implementations disclosed herein use parameterized reward functions to specify a potentially infinite set of lower-level policy models, each of which is trained to match its observed states st to a desired goal specified using the higher-level policy model. The higher-level policy model specifies these goals for temporally extended periods, and uses off-policy correction to enable it to use past experience collected from previous, different instantiations of the lower-level policy model (e.g., different trained states of the lower-level policy model).

Implementations disclosed herein extend the traditional RL setup of a single policy $\mu$ interacting with the environment to a hierarchical two-layer structure, with a lower-level policy $\mu^{lo}$ and a higher-level policy $\mu^{hi}$. At each time step t, the environment provides an observation state $s_t$. The higher-level policy model is utilized to process the observation state $s_t$, and either produces a higher-level action (or goal) $g_t \sim \mu^{hi}$ when t=0 (i.e., by processing the state $s_t$ using the higher-level policy model), or otherwise yields a higher-level action $g_t = h(s_{t-1}, g_{t-1}, s_t)$ using a fixed goal transition function h (described in more detail below). The lower-level policy then observes the state $s_t$ and goal $g_t$ and produces a lower-level atomic action $a_t \sim \mu^{lo}(s_t, g_t)$ (i.e., by processing the state $s_t$ and goal $g_t$ using the lower-level policy model), which is applied to the environment. The environment then yields a reward $R_t$, sampled from an unknown reward function $R(s_t, a_t)$, and transitions to a new state $s_{t+1}$, sampled from an unknown transition function $f(s_t, a_t)$. The higher-level controller provides the lower-level controller with an intrinsic reward $r_t = r(s_t, g_t, a_t, s_{t+1})$, using a fixed intrinsic reward function r. The lower-level policy stores the experience $(s_t, g_t, a_t, r_t, s_{t+1}, h(s_t, g_t, s_{t+1}))$ for off-policy training. The higher-level policy collects the environment rewards $R_t$ and, every c time steps stores the experience $(s_{t:t+c-1}, g_{t:t+c-1}, a_{t:t+c-1}, R_{t:t+c}, s_{t+c})$ for its training. While various implementations described herein generate a new higher-level action every c timesteps for fixed c, other protocols can be utilized. For example, other protocols can be utilized in cases where it is more appropriate to use a learned or fixed lower-level termination function to determine when to re-sample a higher-level action using the higher-level policy model.

The higher-level policy model is utilized to produce $g_t$, indicating desired relative changes in state observations. That is, at step t the higher-level policy model is used to produce a goal $g_t$, indicating its desire for the lower-level agent to take actions which yield it an observation $s_{t+c}$ which is close to $s_t + g_t$. Therefore, the fixed goal transition model h is defined as:

$$h(s_t, g_t, s_{t+1}) = s_t + g_t - s_{t+1} \quad (2)$$

The intrinsic reward is defined as a parameterized reward function. For example, the parameterized reward function can be based on the L2 distance between the current observation and the goal observation:

$$r(s_t, g_t, a_t, s_{t+1}) = -\|s_t + g_t - s_{t+1}\|_2 \quad (3)$$

The parameterized reward function rewards the lower-level policy for taking actions which yield it observations which are close to the desired $s_t + g_t$. In various implementations, $g_t$ can be used to specify and only measure distance on some dimensions of the observation, such as those that encompass the complete collection of positional observations, and ignores things like velocities and visual input.

The lower-level policy model can be trained by incorporating $g_t$ as an additional input to the value and policy models. For example, in DDPG, the equivalent objective to equation (2) (above) in terms of lower-level Q-value function $Q_\theta^{lo}$ is to minimize the error:

$$\left(Q_\theta^{lo}(s_t, g_t, a_t) - r(s_t, g_t, a_t, s_{t+1}) - \gamma Q_\theta^{lo}(s_{t+1}, g_{t+1}, \mu_\phi^{lo}(s_{t+1}, g_{t+1}))\right)^2 \quad (4)$$

for all transitions $(s_t, g_t, a_t, s_{t+1}, g_{t+1})$. The policy $\mu_\phi^{lo}$ is trained to maximize the Q-value $Q_\theta^{lo}(s_t, g_t, \mu_\phi^{lo}(s_t, g_t))$, for all sampled state-tuple goals $(s_t, g_t)$. From the perspective of the lower-level policy, the goal $g_t$ may be interpreted as an additional environment observation.

For HRL methods to be usable in real-world settings, they must be sample-efficient, and therefore will likely require off-policy training. Accordingly, implementations disclosed herein present techniques for off-policy correction that enables principled off-policy training for the higher-level policy model. It is enticing to take the experiences ($s_{t:t+c-1}$, $g_{t:t+c-1}$, $a_{t:t+c-1}$, $R_{t:t+c}$, $s_{t+c}$) collected by the higher-level policy and convert them to state-action-reward transitions ($s_t$, $g_t$, $\Sigma R_{t:t+c}$, $s_{t+c}$,) that can be pushed into the replay buffer of an off-policy RL algorithm. However, transitions obtained using a lower-level policy model in a previously trained state do not accurately reflect the actions (and therefore resultant states $s_{t+1:t+c}$) that would occur if the same goal were used with the current instantiation of the lower-level policy model.

Accordingly, implementations disclosed herein introduce a correction that translates old transitions into modified ones that agree with the current instantiation of the lower-level policy model. In those implementations, the higher-level action $g_t$, which in the past induced a lower-level behavior $a_{t:t+c-1} \sim \mu^{lo}(s_{t:t+c-1}, g_{t:t+c-1})$, is re-labelled to a goal $\tilde{g}_t$ which is likely to induce the same lower-level behavior with the current instantiation of the lower-level policy. For example, the higher-level action of the higher-level transition ($s_t$, $g_t$, $\Sigma R_{t:t+c}$, $s_{t+c}$,) can be re-labelled with a higher-level action $\tilde{g}_t$ chosen to maximize the probability $\mu^{lo}(a_{t:t+c-1}|s_{t:t+c-1}, \tilde{g}_{t:t+c-1})$, where $\tilde{g}_{t+1:t+c-1}$ are computed using the fixed goal transition function h. For instance, although the proposed off-policy learning algorithms train deterministic policies, the behavior policies used in training are traditionally augmented with exploratory Gaussian noise as noted above. Accordingly, the probability $\mu^{lo}(a_{t:t+c-1}|s_{t:t+c-1}, \tilde{g}_{t:t+c-1})$ may be computed as proportional to:

$$\mu^{lo}(a_{t:t+c-1} | s_{t:t+c-1}, \tilde{g}_{t:t+c-1})\alpha - \frac{1}{2}\sum_{i=t}^{t+c-1} \|a_i - \mu^{lo}(s_i, \tilde{g}_i)\|_2^2 + const. \quad (5)$$

To approximately maximize this quantity in practice, the log probability for a number of goals $g_t$ can be computed, and the maximal goal chosen to re-label the experience. As one example, the quantity can be calculated on 8 (or other quantity>1) candidate goals sampled randomly from a Gaussian centered at $s_{t+c}-s_t$. The original goal $g_t$ can also be included and/or a goal corresponding to the difference $s_{t+c}-s_t$ in the candidate set, to have a total of 10 candidates. This provides a suitably diverse set of $\tilde{g}_t$ to approximately solve the arg max of 8, while also biasing the result to be closer to candidates $\tilde{g}_t$.

Although a particular re-labeling technique is described in the preceding paragraphs, additional or alternative techniques can be utilized. For example, the experience replay stores ($s_{t:t+c}$, $a_{t:t+c-1}$, $g_{t:t+c-1}$, $R_{t:t+c-1}$, $s_{t+c}$) sampled from following a lower-level policy $a_i \sim \mu_\beta^{lo}(a_i|s_i, g_i)$, where $a_i$ is a lower-level action and $g_i$ is higher-level action (or goal for the lower-level policy). In determining a modified high-level action, the following objective for the current lower-level policy $\mu^{lo}(a|s, g)$ can be estimated, where $Q^{hi}$ represents the target network:

$$L(\theta) = \mathbb{E}_\beta[Q_\theta^{hi}(s_t, g_t) - y_t)^2] \quad (6)$$

$$y_t = \mathbb{E}_{\prod_{i=t}^{t+c-1} \mu^{lo}(a_i | s_i, g_i)p(s_{i+1}|s_t, a_i)}[R_{t:t+c-1} + \gamma \max_g Q^{hi}(s_{t+c}, g)] \quad (7)$$

$$= \mathbb{E}_{\prod_{i=t}^{t+c-1} \mu_\beta^{lo}(a_i | s_i, g_i)p(s_{i+1}|s_t, a_i)}[w_t \cdot (R_{t:t+c-1} + \gamma \max_g Q^{hi}(s_{t+c}, g))] \quad (8)$$

$$w_t = \prod_{i=t}^{t+c-1} \frac{\mu^{lo}(a_i | s_i, g_i)}{\mu_\beta^{lo}(a_i | s_i, g_i)} \quad (9)$$

Various techniques can be utilized in determining a modified high-level action based on the estimated objective. As one example, a new goal $\tilde{g}_t$ can be sought such that the importance weight, defined by Equation 9, is approximately 1. This leads to the action re-labeling objective being $$L(\theta) = \mathbb{E}_\beta[Q_\theta^{hi}(s_t, \tilde{g}_t) - \hat{y}_t)^2] \quad (10)$$

$$\hat{y}_t = R_{t:t+c-1} + \gamma \max_g Q^{hi}(s_{t+c}, g)) \quad (11)$$

where $\tilde{g}_t$ can be found by minimizing the loss function such as, $$\tilde{g}_t = \arg\min_{g_t}\left(\prod_{i=t}^{t+c-1} \frac{\mu^{lo}(a_i | s_i, g_i)}{\mu_\beta^{lo}(a_i | s_i, g_i)}\right)^2, \quad (12)$$

or $$\tilde{g}_t = \arg\min_{g_t}\left(\sum_{i=t}^{t+c-1} \log\mu^{lo}(a_i | s_i, g_i) - \log\mu_\beta^{lo}(a_i | s_i, g_i)\right)^2, \quad (13)$$

Various environments, tasks, and/or robots can be utilized in generating experience data to train an HRL model according to implementations disclosed herein. The trained HRL model can then be utilized with similar environments, tasks, and/or robots. As one non-limiting example, a robot that emulates an ant can be utilized, and a gathering task utilized where the robot seeks to gather certain target objects while avoiding other negative objects. The target objects and/or negative objects can be randomly placed in the environment at the beginning of each episode. In addition to observing its own position and velocity, the robot also observes depth readings of within its sensor range, and such depth readings can be utilized as part of the state described herein. An environment reward of 1 can be applied for each target object encountered and an environment reward of −1 applied for each negative object encountered. As another non-limiting example, a moveable block can be included in an environment and the robot can interact with the moveable block in attempting to reach a goal location in the environment (e.g., the block must be moved to reach the goal location). The environment reward at each step can be the current negative L2 distance to the goal location.

Turning now to the Figures, FIG. 1 illustrates an example environment in which implementations disclosed herein can be implemented. FIG. 1 includes a lower-level (also referenced as low-level) policy model 156 and a higher-level (also referenced as high-level) policy model 154, which cooperatively form a hierarchical reinforcement learning model. The high-level policy model 154 can be trained by a high-level off-policy trainer 124. In training the high-level policy model 154, the high-level off-policy trainer 124 can utilize experience data 158 collected from past experience episodes, as described herein. Moreover, and as also described herein, high-level action modification engine 139 can interface with (or be incorporated as part of) high-level off-policy trainer 124 and can generate modified high-level actions to utilize during off-policy training of the high-level policy model 154. For example, the high-level action modification engine 139 can replace high-level actions, from experience data 158, with modified higher-level actions chosen to maximize the probability of the past lower-level actions of corresponding experience data, in view of a currently trained version of the lower-level policy model 156. The low-level policy model 156 can be trained by a low-level off-policy trainer 126 using experience data 158, as described herein.

In FIG. 1, a high-level engine 134 is illustrated that interacts with the high-level policy model 154 (effectively forming a high-level agent) in processing a state observation 101 to generate a high-level action 103, which is passed to low-level engine 136. As described herein, the high-level engine 134 can process a corresponding current state observation every c time steps/control steps, where c is greater than 1. For intermediate time steps, transition high-level actions 104 can be generated (e.g., by high-level engine 134) and passed to low-level engine 136. Each transition high-level action 104 can be generated based on a fixed transition function, in dependence on a preceding high-level action (103, or previous iteration of 104) and in dependence on an updated state observation generated by applying the preceding low-level action 105 generated by the low-level engine 136.

The low-level engine 136 interacts with the low-level policy model 156 (effectively forming a low-level agent) in processing the state observation 101 and the high-level action 103 (or transition high-level action 104) to generate a low-level action 105. The low-level engine 136 can generate a corresponding low-level action 105 at each time step/control step, in dependence on the current state observation 101 and the current high-level action 103 or the current transition high-level action 104.

The low-level action 105 can be processed by a control engine 142 and corresponding control commands 106 provided to actuator(s) 144 of a robot (real or simulated) to cause implementation of the low-level action 105 by the robot, resulting in a new state observation 101 that can then be processed by the low-level engine 136 and optionally the high-level policy engine 134 (e.g., in dependence on the time step). It is noted that in various implementations the low-level action 105 comprises torque(s) or other command (s) that can be directly applied as control commands 106 without any interpretation by control engine 142.

Robot 110 is also illustrated in FIG. 1, and is one example of a physical (i.e., real-world) mobile robot that can utilize a high-level policy model and low-level policy model, trained according to implementations disclosed herein, in the performance of one or more robotic tasks. Additional and/or alternative robots may be provided, such as additional robots that vary in one or more respects from robot 110 illustrated in FIG. 1. For example, a mobile forklift robot, an unmanned aerial vehicle ("UAV"), a multiped robot (e.g., ant-like robot), and/or a humanoid robot may be utilized instead of or in addition to robot 110. Robot 110 and/or other robot can also be simulated, by a robotic simulator, in generating simulated experience data.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision component 111 that can generate observation data related to shape, color, depth, and/or other features of object(s) that are in the line of sight of the vision component 111. The vision component 111 may be, for example, a monocular camera, a stereographic camera, and/or a 3D lidar component. The robot also include an additional vision component 112 that can generate observation data related to shape, color, depth, and/or other features of object(s) that are in the line of sight of the vision component 112. The vision component 112 may be, for example, a proximity sensor, a one-dimensional (1D) LIDAR component, or a two-dimensional (2D) LIDAR component. In various implementations, the vision component 111 generates higher fidelity observations (relative to the vision component 112).

Robot 110 also includes one or more processors that, for example: implement the high-level engine 134 and the low-level engine 136 (described below) and provide control commands to actuators and/or other operational components thereof based on low-level actions generated utilizing the low-level policy model (and based on output generated using the high-level policy model 154). The robot 110 also includes robot arms 114A and 114B with corresponding end effectors 115A and 115B that each take the form of a gripper with two opposing "fingers" or "digits." Although particular grasping end effectors 115A, 115B are illustrated, additional and/or alternative end effectors may be utilized, such as alternative impactive grasping end effectors (e.g., those with grasping "plates", those with more or fewer "digits"/ "claws"), "ingressive" grasping end effectors, "astrictive" grasping end effectors, or "contigutive" grasping end effectors, or non-grasping end effectors. Additionally, although particular placements of vision components 111 and 112 are illustrated in FIG. 1, additional and/or alternative placements may be utilized.

As mentioned above, processor(s) of the robot 110 can implement high-level engine 134 and low-level engine 136, which operate utilizing respective of high-level policy model 154 and low-level policy model 156, once they have been trained. Control engine 142 can also be implemented by processor(s) of the robot 110 and the actuator(s) 144 are actuator(s) of the robot 110. The robot 110 can further include, in local storage (e.g., RAM and/or ROM) the high-level policy model 154 and the low-level policy model 156.

Figure 2:
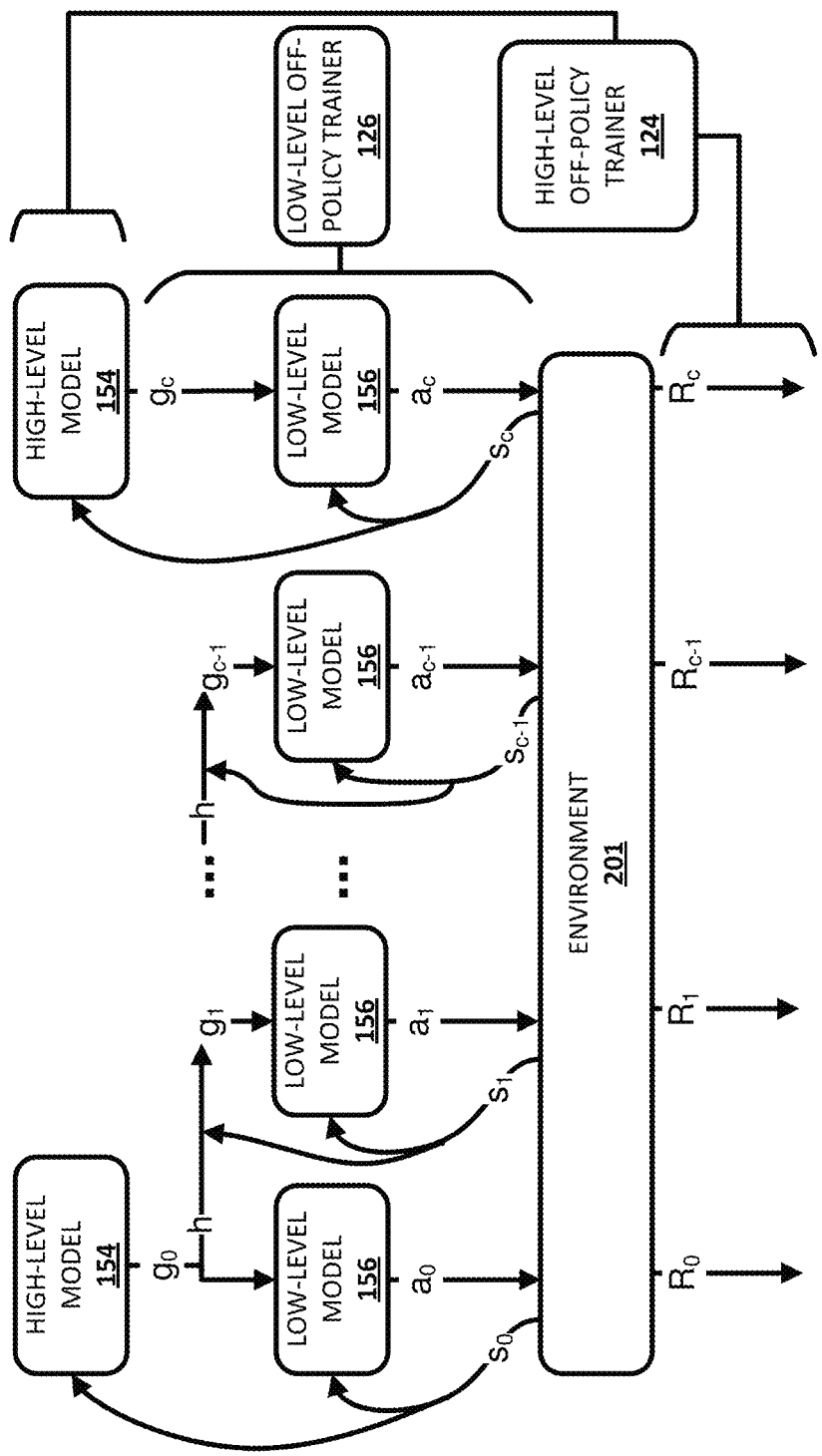
FIG. 2 illustrates a flow diagram that illustrates components of FIG. 1 and various implementations of collecting experience data using a hierarchical reinforcement learning model, and utilizing the collected experience data in off-policy training of the hierarchical reinforcement learning model.

FIG. 2 illustrates a flow diagram that illustrates components of FIG. 1 and various implementations of collecting experience data using a hierarchical reinforcement learning model, and utilizing the collected experience data in off-policy training of the hierarchical reinforcement learning model. Moving from left to right in FIG. 2, at an initial time step a current state $s_0$ is processed (e.g., by high-level engine 134 of FIG. 1) using the high-level policy model 156 to generate a high-level action $g_0$. The high-level action $g_0$ is processed along with the current state $s_0$ (e.g., by low-level engine 136 of FIG. 1) using the low-level policy model 156 to generate a low-level action $a_0$. The low-level action $a_0$ is applied to the environment 201 (e.g., applied to a real or simulated robot) to cause a new current state $s_1$ to be generated. Further, an environment reward $R_0$ is also generated based on the new current state $s_1$. For example, the environment reward $R_0$ can be generated using an unknown reward function and/or based on a task for which the high-level policy model 156 is being trained. For instance, the environment reward $R_0$ can be based on a distance to a final target location, whether a target location or object was encountered, whether a negative object (i.e., one to avoid) was encountered, and/or other factor(s) obtainable from the environment state. As described herein, an intrinsic reward can also be generated based on comparison of the new current state $s_1$, to a goal state indicated by the high-level action $g_0 \cdot s$ At the next time step, the new current state $s_1$ is processed, along with the high-level action $g_0$ and using a transition function, to generate a new high-level action $g_1$. In other words, at the next time step the high-level policy model is not utilized to generate the new high-level action $g_1$. Rather, the new high-level action $g_1$ is inferred from the high-level action $g_0$ based on the new current state $s_1$. The new high-level action $g_1$ is then processed along with the new current state $s_1$ using the low-level policy model 156 to generate another low-level action $a_1$. The low-level action $a_1$ is applied to the environment 201 (e.g., applied to a real or simulated robot) to cause a new current state $s_2$ to be generated. Further, an environment reward $R_1$ is also generated based on the new current state $s_2$. For example, the environment reward $R_1$ can be generated using an unknown reward function and/or based on a task for which the high-level policy model 156 is being trained. An intrinsic reward can also be generated based on comparison of the new current state $s_2$ to a goal state indicated by the high-level action $g_1$.

This general process can be repeated for one or more additional time steps (as indicated by the ellipses), including time step c-1. At time step c-1, a new current state $s_{c-1}$ (generated responsive to the action of time step c-2) is processed, along with the high-level action $g_{c-2}$ of the prior time step and using a transition function, to generate a new high-level action $g_{c-1}$. The new high-level action $g_{c-1}$ is then processed along with the new current state $s_{c-1}$ using the low-level policy model 156 to generate another low-level action $a_{c-1}$. The low-level action $a_{c-1}$ is applied to the environment 201 to cause a new current state $s_c$ to be generated. Further, an environment reward $R_{c-1}$ is also generated based on the new current state $s_{c-1}$. An intrinsic reward can also be generated based on comparison of the new current state $s_c$ to a goal state indicated by the high-level action $g_{c-1}$.

At time step c, the high-level policy model 154 is again utilized to process the current state (state $s_c$) to generate a new high-level action $g_c$. The new high-level action $g_c$ is then processed along with the new current state $s_c$ using the low-level policy model 156 to generate another low-level action $a_c$. The low-level action $a_c$ is applied to the environment 201 to cause a new current state $s_{c+1}$ to be generated. Further, an environment reward $R_c$ is also generated based on the new current state $s_{c+1}$. An intrinsic reward can also be generated based on comparison of the new current state $s_c$ to a goal state indicated by the high-level action $g_c$. The flow generally indicated in FIG. 2 will again continue, with new high-level actions being inferred for the next c time steps. The flow will continue until an episode termination condition is met (e.g., target location or other task goal reached), or until a threshold quantity of time steps have occurred.

The experience transitions ($s_t$, $g_t$, $a_t$, $r_t$, $s_{t+1}$, $g_{t+1}$) are stored and subsequently utilized by the low-level off-policy trainer 126 to train the low-level policy model 156. In training the low-level policy model, the low-level off-policy trainer 126 uses intrinsic rewards determined based on $r_t = r(s_t, g_t, a_t, s_{t+1})$. The environment rewards and temporally-extended experience (including environment rewards $R_t$) are stored as ($s_{t:t+c-1}$, $g_{t:t+c-1}$, $a_{t:t+c-1}$, $\Sigma R_{t:t+c-1}$, $s_{t+c}$) and subsequently utilized by the high-level off-policy trainer 124 in training the high-level policy model 154. As described herein, during training, the high-level actions g of the stored extended experiences can be re-labeled as $\tilde{g}$ to adjust for training updates to the low-level policy model 156. The updated low-level policy model 156 and updated high-level policy model 154 can be used in generating subsequent experience data, and this general process repeated until the policy models 154 and 156 are deemed sufficiently trained based on one or more criteria (e.g., threshold quantity of training iterations, threshold performance characteristics, and/or other criterion/criteria).

Figure 3:
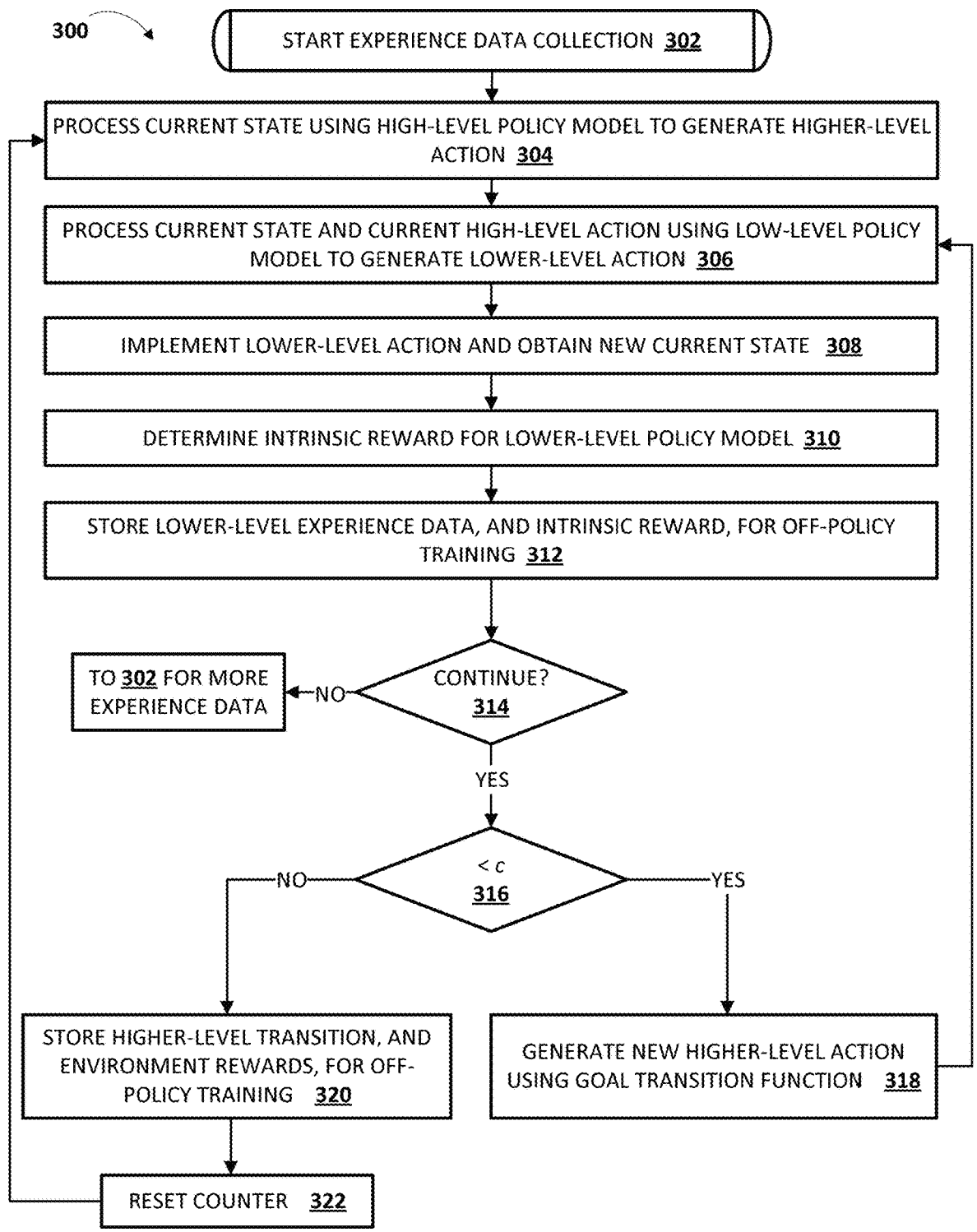
FIG. 3 is a flowchart illustrating an example method of collecting experience data using a hierarchical reinforcement learning model.

FIG. 3 is a flowchart illustrating an example method 300 of collecting experience data using a hierarchical reinforcement learning model. For convenience, the operations of the flow chart are described with reference to a system that performs the operations. This system may include one or more components of one or more computer systems. Moreover, while operations of method 300 are shown in a particular order, this is not meant to be limiting. One or more operations may be reordered, omitted or added.

At block 302, the system starts experience data collection.

At block 304, the system processes a current state using a high-level policy model to generate a higher-level action.

At block 306, the system processes the current state and current high-level action, using a low-level policy model, to generate a lower-level action.

At block 308, the system implements the lower-level action and obtains a new current state that results from the implementation of the lower-level action.

At block 310, the system determines an intrinsic reward for the lower-level policy model. For example, where the higher-level action is a robotic state differential indicating a goal state, the intrinsic reward can be positive when the new current state of block 308 matches or is close to the goal state. Optionally, the magnitude of the reward can be based on how closely the new current state of block 308 is to the goal state. Accordingly, in generating a reward, the state observation generated based on applying the lower-level action can be compared to the goal state indicated by the higher-level action.

At block 312, the system stores lower-level experience data, and the intrinsic reward, for off-policy training of the lower-level policy model.

At block 314, the system determines whether to continue the current experience data episode. For example, at block 314 the system can determine to continue so long as a task goal has not been achieved and/or a threshold quantity of steps have not yet occurred.

If, at an iteration of block 314, the system determines not to continue, then the system returns to block 302 for more experience data collection. For example, the environment can be reset (optionally to a new initial state) and another experience episode performed.

If, at an iteration of block 314, the system determines to continue, then the system proceeds to block 316.

At block 316, the system determines whether <c control steps have occurred since a last iteration of block 304. If so, the system proceeds to block 318 and, if not, the system proceeds to block 320.

At block 318, the system generates a new higher-level action using a goal transition function, and returns to block 306 to process the current state and the new higher-level action using the low-level policy model to generate a new lower-level action.

At block 320, the system stores a higher-level transition, and environment rewards, for off-policy training. For example, the system stores the higher-level transition for the last c control steps, along with the environment rewards for the last c control steps. The environment rewards can be determined based on environment observations after iterations of block 308 in the last c control steps, and optionally in view of a task for which the higher-level policy model is being trained.

The system then proceeds to block 322 and resets a counter (for counting whether c control steps have occurred) and returns to block 304 to process the current state using the high-level policy model to generate a new higher-level action.

Method 300 can be performed to generate a large quantity of experience data for training the lower-level and higher-level policy models. Further, in some implementations, multiple instances of method 300 can be performed in parallel. Yet further, in various implementations updates to the lower-level and higher-level policy models can be made between some or all episodes of method 300 (i.e., when block 314 determination is "no"), where the updates are based on off-policy training of the models that can be occurring in parallel via method 400, described below.

Figure 4:
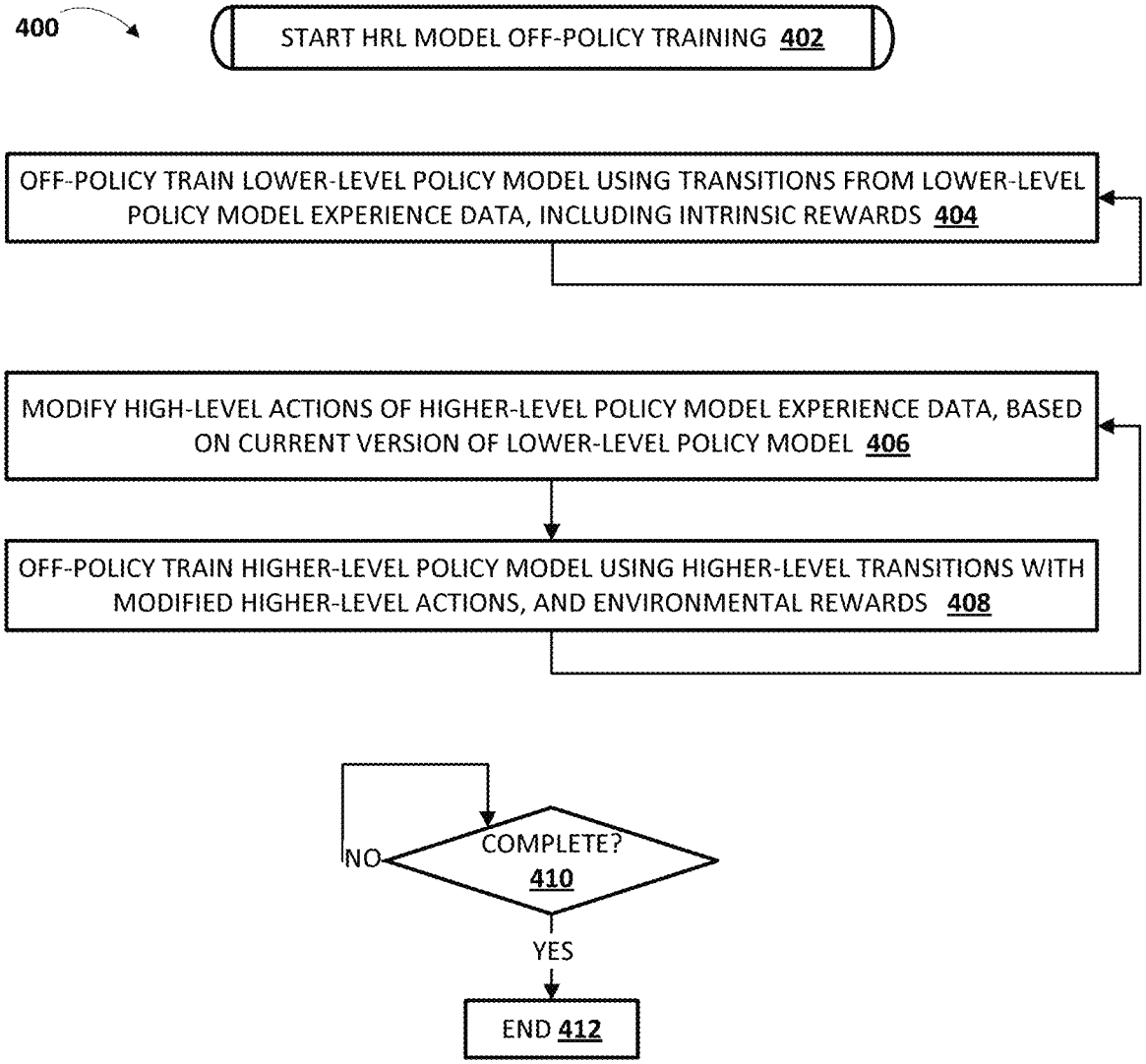
FIG. 4 is a flowchart illustrating an example method of off-policy training of the hierarchical reinforcement learning model, using experience data previously collected according to the method of FIG. 3.

FIG. 4 is a flowchart illustrating an example method 400 of off-policy training of the hierarchical reinforcement learning model, using experience data previously collected according to the method of FIG. 3. For convenience, the operations of the flow chart are described with reference to a system that performs the operations. This system may include one or more components of one or more computer systems, such as one or more processors of a robot. Moreover, while operations of method 400 are shown in a particular order, this is not meant to be limiting. One or more operations may be reordered, omitted or added.

At block 402, the system starts hierarchical reinforcement learning model off-policy training.

At block 404, the system off-policy trains a lower-level policy model using transitions from lower-level policy model experience data, including intrinsic rewards. For example, the system can train the lower-level policy model using an instance of experience data that was previously stored in block 312 of method 300. The system then continues to perform further iterations of block 404, further training the lower-level policy model using additional instances of experience data. As described herein, updated versions of the lower-level policy model can be periodically pushed for utilization in generating experience data in method 300, and the experience data utilized in iterations of block 404 can be generated based on versions of the lower-level policy model that differ from that being trained in those iterations at block 404. However, off-policy learning can be effectively utilized in view of the rewards being determined based on the resulting states and goal states as described herein. In some implementations, multiple iterations of block 404 can be performed in parallel.

The system performs iterations of block 406 and 408 in parallel with iterations of block 404. At block 406, the system modifies, based on a current version of the lower-level policy model (e.g., as recently trained at an iteration of block 404), high-level actions of higher-level policy model experience data. For example, at block 406 the modified higher-level actions can be chosen to maximize the probability of the past lower-level actions of the experience data, in view of the current version of the lower-level policy model.

At block 408, the system off-policy trains a higher-level policy model using higher-level transitions with the modified higher-level action, and environmental rewards from the experience data. For example, the system can train the higher-level policy model using an instance of experience data that was previously stored in block 320 of method 300. The system then continues to perform further iterations of blocks 406 and 408, further training the higher-level policy model using additional instances of experience data. As described herein, updated versions of the higher-level policy model can be periodically pushed for utilization in generating experience data in method 300, and the experience data utilized in iterations of blocks 406 and 408 can be generated based on versions of the higher-level and lower-level policy model that differ from that being trained in those iterations at blocks 406 and 408. However, off-policy learning can be effectively utilized in view of the modification of block 406. In some implementations, multiple iterations of blocks 406 and 408 can be performed in parallel.

At block 410, the system determines whether the off-policy training (e.g., the off-policy training at blocks 404 and 408) is complete. This can be based on various considerations such as whether a threshold quantity of training iterations has been completed, whether any experience data is remaining, whether certain performance characteristics have been achieved, and/or other consideration(s).

If, at an iteration of block 410, the system determines the off-policy training is not complete, then the system continues to perform iterations of block 410 until it determines the off-policy training is complete.

If, at an iteration of block 410, the system determines the off-policy training is complete, then the system proceeds to block 412 and training ends. The trained hierarchical reinforcement learning model can then be deployed and used on one or more real-world robots.

A robot that is controlled according to techniques disclosed herein can take various forms, including but not limited to a telepresence robot, a humanoid robot, an animal robot, an insect robot, an aquatic robot, a wheeled robot, a submersible robot, an unmanned aerial vehicle ("UAV") robot, and so forth. In various implementations, the robot may include one or more processors that can implement all and/or aspects of various method disclosed herein. Processor(s) of a robot may take various forms, such as one or more CPUs, one or more GPUs, one or more field-programmable gate arrays ("FPGA"), and/or one or more application-specific integrated circuits ("ASIC"). In some implementations, the processor(s) may be operably coupled with memory. Memory may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

Figure 5:
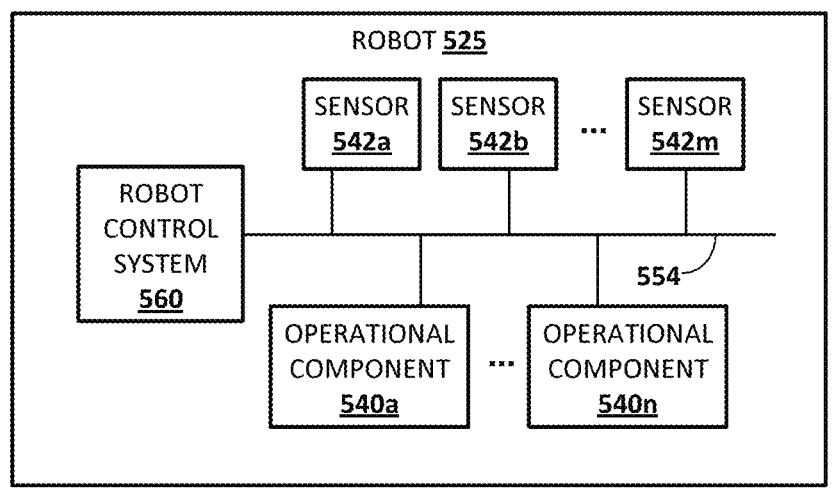
FIG. 5 schematically depicts an example architecture of a robot.

FIG. 5 schematically depicts an example architecture of a robot 525. The robot 525 includes a robot control system 560, one or more operational components 540a-540n, and one or more sensors 542a-542m. The sensors 542a-542m may include, for example, vision sensors, light sensors, pressure sensors, pressure wave sensors (e.g., microphones), proximity sensors, accelerometers, gyroscopes, thermometers, barometers, and so forth. While sensors 542a-542m are depicted as being integral with robot 525, this is not meant to be limiting. In some implementations, sensors 542a-542m may be located external to robot 525, e.g., as standalone units.

Operational components 540a-540n may include, for example, one or more end effectors and/or one or more servo motors or other actuators to effectuate movement of one or more components of the robot. For example, the robot 525 may have multiple degrees of freedom and each of the actuators may control actuation of the robot 525 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 525. In some implementations, the robot 525 may comprise a "brain box" that may include all or aspects of the control system 560. For example, the brain box may provide real time bursts of data to the operational components 540a-540n, with each of the real time bursts comprising a set of one or more control commands that dictate, inter alia, the parameters of motion (if any) for each of one or more of the operational components 540a-540n. In some implementations, the robot control system 560 may perform one or more aspects of methods described herein.

As described herein, in some implementations all or aspects of the control commands generated by control system 560 in performing a robotic task can be based on utilization of a trained hierarchical reinforcement learning model as described herein. Although control system 560 is illustrated in FIG. 5 as an integral part of the robot 525, in some implementations, all or aspects of the control system 560 may be implemented in a component that is separate from, but in communication with, robot 525. For example, all or aspects of control system 560 may be implemented on one or more computing devices that are in wired and/or wireless communication with the robot 525, such as computing device 610.

Figure 6:
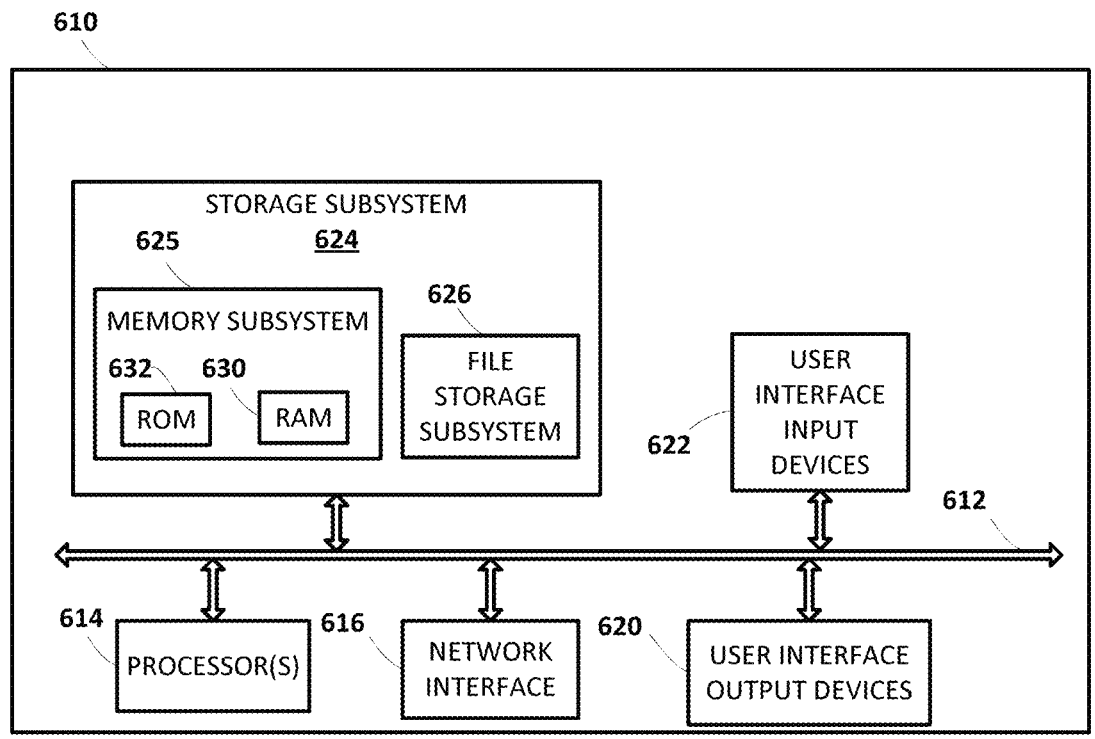
FIG. 6 schematically depicts an example architecture of a computer system.

Although various methods described herein can be implemented by a robot, others can be implemented by one or more computing devices. For example, generating experience data can be performed by computing device(s) operating a robotic simulator. Also, for example, off-policy training can be performed using a distributed collection of computing device(s). FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

We claim:

1. A method implemented by one or more processors of a robot, the method comprising:
   at a first control step:
   identifying a first current state observation;
   determining, using a higher-level policy model, a higher-level action for transitioning from the first current state to a goal state;
   generating a first lower-level action based on processing, using a lower-level policy model, the first current state observation and the higher-level action; and
   applying the first lower-level action to cause the robot to transition to an updated state;
   at a second control step:
   identifying a second current state observation;
   generating a second lower-level action based on processing, using the lower-level policy model, the second current state observation and the higher-level action that was determined in the first control step; and applying the second lower-level action to cause the robot to transition to a further updated state; and at a subsequent control step that is subsequent to the second control step:

identifying a subsequent current state observation;

determining, using the higher-level policy model, a subsequent higher-level action for transitioning from the subsequent current state to the goal state;

generating a subsequent lower-level action based on processing, using the lower-level policy model, the subsequent current state observation and the subsequent higher-level action; and applying the subsequent lower-level action to cause the robot to transition to a subsequent updated state.

2. The method of claim 1, wherein the subsequent control step is immediately subsequent to the second control step.

3. The method of claim 2, further comprising:

generating a first intrinsic reward for the first lower-level action, the first intrinsic reward generated based on the updated state and the goal state;

generating a second intrinsic reward for the second lower-level action, the second intrinsic reward generated based on the further updated state and the goal state; and training the lower-level policy model based on the first and second intrinsic rewards.

4. The method of claim 3, wherein:

generating the first intrinsic reward based on the updated state and the goal state comprises generating the first intrinsic reward based on an L2 difference between the updated state and the goal state observation; and generating the second intrinsic reward based on the further updated state and the goal state comprises generating the second intrinsic reward based on an L2 difference between the further updated state and the goal state observation.

5. The method of claim 1, wherein the first lower-level action includes torques that are applied to actuators of the robot to cause the robot to transition to the updated state.

6. The method of claim 5, wherein the higher-level action is a robotic state differential indicating the goal state.

7. The method of claim 1, wherein the higher-level action is a robotic state differential indicating the goal state.

8. The method of claim 1, wherein the first lower-level action includes one or more commands that are directly applied to actuators of the robot to cause the robot to transition to the updated state.

9. A robot comprising:

one or more vision components;

one or more actuators;

memory storing instructions;

one or more processors operable to execute the instructions to:

at a first control step:

identify a first current state observation;

determine, using a higher-level policy model, a higher-level action for transitioning from the first current state to a goal state;

generate a first lower-level action based on processing, using a lower-level policy model, the first current state observation and the higher-level action; and apply the first lower-level action to one or more of the actuators to cause the robot to transition to an updated state;

at a second control step:

identify a second current state observation;

generate a second lower-level action based on processing, using the lower-level policy model, the second current state observation and the higher-level action that was determined in the first control step; and apply the second lower-level action to one or more of the actuators to cause the robot to transition to a further updated state; and at a subsequent control step that is subsequent to the second control step:

identify a subsequent current state observation;

determine, using the higher-level policy model, a subsequent higher-level action for transitioning from the subsequent current state to the goal state;

generate a subsequent lower-level action based on processing, using the lower-level policy model, the subsequent current state observation and the subsequent higher-level action; and apply the subsequent lower-level action to one or more of the actuators to cause the robot to transition to a subsequent updated state.

10. The robot of claim 9, wherein the subsequent control step is immediately subsequent to the second control step.

11. The robot of claim 9, wherein one or more of the processors are further operable to execute the instructions to:

generate a first intrinsic reward for the first lower-level action, the first intrinsic reward generated based on the updated state and the goal state;

generate a second intrinsic reward for the second lower-level action, the second intrinsic reward generated based on the further updated state and the goal state; and train the lower-level policy model based on the first and second intrinsic rewards.

12. The robot of claim 11, wherein:

in generating the first intrinsic reward based on the updated state and the goal state one or more of the processors are to generate the first intrinsic reward based on an L2 difference between the updated state and the goal state observation; and in generating the second intrinsic reward based on the further updated state and the goal state one or more of the processors are to generate the second intrinsic reward based on an L2 difference between the further updated state and the goal state observation.

13. The robot of claim 9, wherein the first lower-level action includes torques.

14. The robot of claim 13, wherein the higher-level action is a robotic state differential indicating the goal state.

15. The robot of claim 9, wherein the higher-level action is a robotic state differential indicating the goal state.

16. The robot of claim 9, wherein the first lower-level action includes one or more commands that are directly applied to one or more of the actuators.

* * * * *